Oct. 18, 1949.

L. E. HOYT 2,485,383

MOWER ATTACHMENT FOR TRACTORS

Filed May 26, 1947

INVENTOR.
Leo E. Hoyt
BY
Otis A. Earl
Attorney.

Oct. 18, 1949.  L. E. HOYT  2,485,383
MOWER ATTACHMENT FOR TRACTORS
Filed May 26, 1947  2 Sheets-Sheet 2

INVENTOR.
Leo E. Hoyt
BY
Attorney.

Patented Oct. 18, 1949

2,485,383

UNITED STATES PATENT OFFICE 2,485,383

MOWER ATTACHMENT FOR TRACTORS

Leo E. Hoyt, Climax, Mich.

Application May 26, 1947, Serial No. 750,515

5 Claims. (Cl. 56—25)

This invention relates to improvements in a mower attachment for tractors.

The principal objects of this invention are:

First, to provide an attachment for farm tractors for mounting a guard or cutter bar and sickle blade in front of the tractor in full view of the operator.

Second, to provide a mower attachment for a tractor in which power for operating the mower is derived directly from the tractor and in which the mower may be raised or lowered hydraulically.

Third, to provide a mower attachment for tractors which will utilize the cutter bar and sickle blade of existing mowing machines thus reducing the cost of the attachment to the user.

Fourth, to provide a mower attachment for tractors which will effectively cut hay, grain or other grasses and locate the cut grass in the center of the swath leaving an open row for the next cut with the tractor with a minimum of crushing of the fallen grass by the wheels of the tractor.

Fifth, to provide a mower attachment having the above characteristics which is inexpensive to manufacture and easy to install on a tractor.

Other objects and advantages relating to the details and economies of the invention will be apparent from the following description and claims.

The drawings, of which there are two sheets, illustrate a preferred form of my attachment as mounted on a farm tractor.

Figure 1:
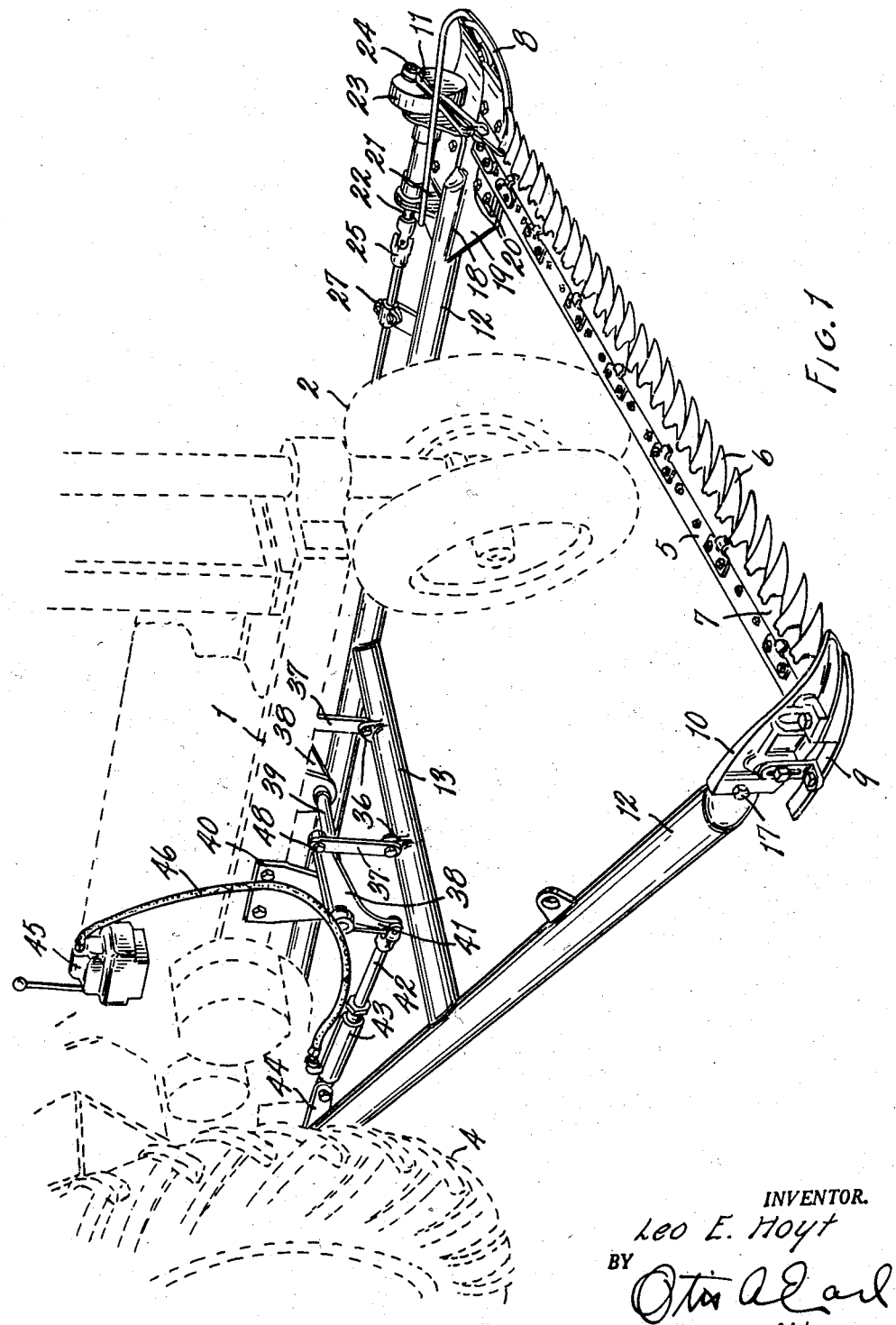
Fig. 1 is a front perspective view of my mower bar attachment mounted on a farm tractor, the tractor being illustrated in broken lines.

The drawings illustrate a farm tractor of familiar style having a frame 1 on which are mounted the steerable front wheels 2 and which is connected at its rear end to a rear axle and differential housing 3 for drivingly supporting the rear wheels 4. My mower attachment consists of a cutter bar 5 having forwardly projecting tines or guards 6 and a sickle bar 7 reciprocably mounted on the cutter bar. The left end of the cutter bar is secured to a shoe 8 and the right end of the cutter bar is secured to a flanged shoe 9 having an upwardly extending inwardly curved flange 10. The sickle bar is arranged to be reciprocated on the cutter bar by actuation of the connecting rod 11. The mower assembly thus described and illustrated is a standard mower presently in use in mowing machines but is normally mounted on the side of a separate carriage arranged to be either horse or tractor drawn. The flange 10 on the right or outer shoe is arranged on present mowing machines to be attached to and support a mold or divider board for folding over and falling the cut grass toward the center of the swath.

Figure 2:
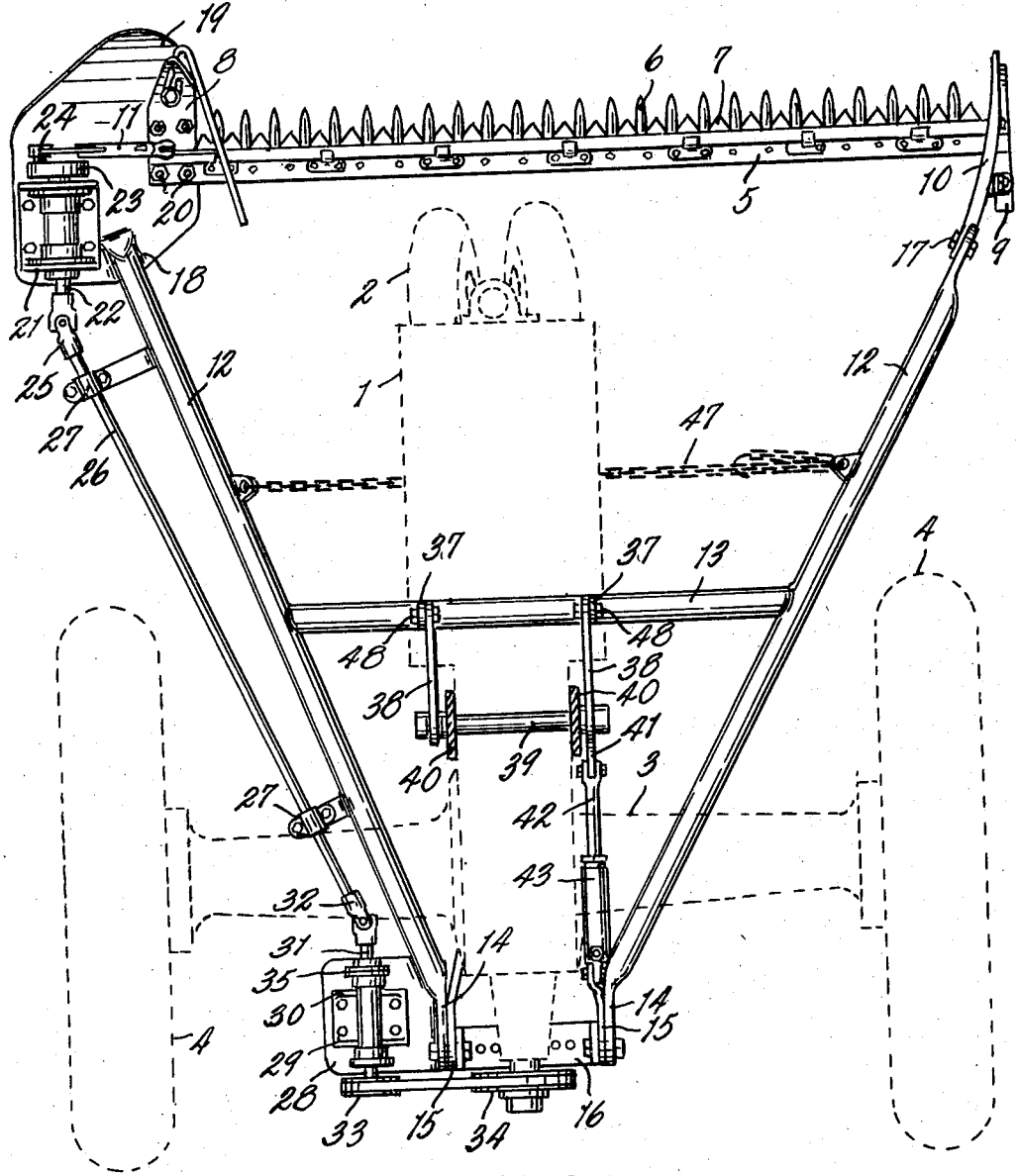
Fig. 2 is a plan view of my mower attachment as mounted on a tractor, portions of the connections to the tractor being shown in cross section.

My attachment for mounting the cutter bar just described on a tractor consists of a pair of forwardly diverging arms 12 which are preferably made of tubular steel stock. The side arms 12 are connected intermediate of their ends by a cross bar 13 and flattened in parallel relationship as at 14 (see Fig. 2) for pivotal attachment to the rearwardly extending parallel draft bars 15 on the rear of the tractor. The draft bars 15 are connected by a draw bar 16 and the draft bars and draw bar are commonly provided on most tractors.

The forward end of the right side arm 12 is vertically flattened and pierced to be bolted to the flange 10 as at 17 in place of the mold board normally bolted to the outer shoe. The forward end of the left arm 12 is horizontally flattened and welded as at 18 to a skid plate 19 which extends forwardly of the side arm and is curved upwardly along its front edge to conform with the curvature of the left shoe 8 on the cutter bar. The skid plate 19 is apertured to be bolted to the shoe 8 as at 20 and to receive the base of a U-shaped bracket 21.

The flanges of the bracket 21 are spaced longitudinally of the tractor and support bearings for a drive shaft 22 having a crank wheel 23 on the forward end thereof. The crank wheel 23 is provided with a crank pin 24 for driving the connecting rod 11 and reciprocating the sickle bar 7. The driven shaft 22 is provided with a universal joint connection 25 to a propeller shaft 26 extending rearwardly along the side of the left arm 12. Bearing brackets 27 are welded to the arm 12 to rotatably support the propeller shaft adjacent to its ends.

The rear end of the left arm 12 is welded to and supports a laterally extending plate 28 which forms a support for a second U-shaped bracket 29 having longitudinally spaced flanges 30 supporting bearings for the drive shaft 31. The forward end of the drive shaft 31 is provided with a universal joint connection 32 to the rear end of the propeller shaft and the rear end of the drive shaft is provided with a pulley 33 belt connected to the power take-off pulley 34 of the tractor. The power take-off pulley 34 of most tractors is provided with a disengaging clutch so that the cutter bar of the mower attachment may be selectively operated but if no such clutch is provided on the tractor, a clutch may be incorporated in the drive shaft 31 as conventionally illustrated at 35.

The cross bar 13 of the mower attachment is provided with a pair of ears 36 which are connected by the links 37 to the free ends of crank arms 38 secured to a rock shaft 39. The rock shaft 39 is pivotally supported by a pair of depending plates or brackets 40 secured to the side frame 1 of the tractor and one of the cranks 38 is provided with a depending arm 41 connected to the piston rod 42 of a hydraulic cylinder 43. The rear end of the cylinder 43 is attached by the bracket 44 to the body of the tractor. The hydraulic system of the tractor is connected through the valve 45 and hose 46 to the cylinder 43 so that the mower attachment may be selectively raised or lowered by the operator. A safety chain 47 is provided which may be looped over the top of the tractor to hold the mower attachment in elevated position while the tractor is being moved along the road.

The mower attachment is easily installed on or removed from the tractor by removing the bolts 48 which connect the cross member 13 to the cranks 38 and the bolts 49 which secure the rear end of the side arms to the draft bars of the tractor. In operating the tractor with the mower attachment in operative position, the driver has a clear view of the ends of the cutter bar. The rearwardly converging character of the side arms 12 effectively engages the cut hay or grass and folds it inwardly into windrows between the rear wheels of the tractor thus leaving an open space along the standing side of the cut so that on the next pass of the cutter over the field, the tractor will not crush or break down the grain and the driver may easily locate the skid plate 19 closely adjacent to the standing side of the grass to assure a full width cut with the mower.

It will be noted that as the grass is cut only the grass directly in front of the front wheels will have any tendency to fall where it will be run over and crushed by the wheels of the tractor. Grass cut by the end portions of the mower will fall between the rear wheels and behind the front wheels as just described and even the grass directly in front of the front wheels will have a tendency to be deflected by the wheels and fall to either side of the front wheels. My mower attachment is of particular advantage on tractors having closely spaced front wheels as shown because of the way it locates the fallen grass but it has definite advantages of economy, ease of operation and ease of attachment when applied to other types of tractors.

As was pointed out before, my attachment is rugged and inexpensively assembled and makes use of existing cutter bars and blades thus reducing the cost of a tractor driven mower attachment to the customer. I have thus described a highly practical commercial embodiment of my attachment and have not attempted to show various possible arrangements thereof as it is felt that such alterations as are desired may be made without further description. Obviously the driving connection to the sickle bar could be located on the opposite end of the mower if desired and other similar alterations could be made in the structure I have described without departing from the theory of my invention.

Having thus described my invention, what I claim as new and desire to secure by Letters Patent, is:

1. A mower attachment for a tractor, comprising a frame including a pair of diverging arms, a cutter bar connected at its ends between the widely spaced ends of the diverging arms, pivotal attaching means at the other ends of the diverging arms, a sickle blade reciprocably mounted on the cutter bar, a rotatable power shaft carried by one of said diverging arms and extending lengthwise thereof from end to end, power take-off means at one end of the power shaft operatively connected to the sickle bar for actuating the same, and driving means at the other end of the shaft adapted to be connected to a source of power, a cross bar connecting said arms intermediate the cutter bar and the pivotal attaching means, and means connected to said cross bar for raising and lowering the frame.

2. A mower attachment for a tractor, comprising a frame consisting of a pair of diverging arms, a cutter bar connected at its ends between the widely spaced ends of the diverging arms, and a cross bar connecting said arms intermediate of their ends, the closely spaced ends of the diverging arms having holes formed therein for pivotally receiving attaching bolts, a sickle blade reciprocably mounted on the cutter bar, a rotatable power shaft carried by one of said diverging arms and extending lengthwise thereof from end to end, power take-off means at one end of the power shaft operatively connected to the sickle bar for actuating the same, driving means drivingly connected to the other end of the shaft and including a second shaft and pulley rotatable about an axis generally perpendicular to said cutter bar and adapted to be connected to a source of power, said driving means being supported on said one arm on which said power shaft is carried, and means connected to said cross bar for raising and lowering the frame.

3. A mower attachment for a tractor, comprising a frame consisting of a pair of diverging arms, a cutter bar connected at its ends between the widely spaced ends of the diverging arms, and a cross bar connecting said arms intermediate of their ends, the closely spaced ends of the diverging arms having holes formed therein for pivotally receiving attaching bolts, a sickle blade reciprocably mounted on the cutter bar, a rotatable power shaft carried by one of said diverging arms and extending lengthwise thereof from end to end, power take-off means at one end of the power shaft operatively connected to the sickle bar for actuating the same, driving means drivingly connected to the other end of the shaft and including a second shaft rotatable about an axis generally perpendicular to said cutter bar and adapted to be connected to a source of power, said driving means being supported on said one arm on which said power shaft is carried, and means connected to said cross bar for raising and lowering the frame.

4. A mower attachment for a tractor, comprising a frame including a pair of diverging arms, a cutter bar connected at its ends between the widely spaced ends of the diverging arms, the closely spaced ends of the diverging arms having tips extending at an angle from said arms, said tips being disposed in parallel relationship and having openings formed therein for receiving pivotal attaching bolts, a sickle blade reciprocably mounted on the cutter bar, a rotatable power shaft carried by one of said diverging arms and extending lengthwise thereof from end to end, power take-off means at one end of the power shaft operatively connected to the sickle bar for actuating the same, driving means drivingly connected to the other end of the shaft adapted to be connected to a source of power, said driving means being supported on said one arm and including a second shaft extending generally perpendicular to said cutter bar, a cross bar connecting said arms intermediate the cutter bar and the tips, and means connected to said cross bar for raising and lowering the frame.

5. A mower attachment for a tractor, comprising a frame including a pair of diverging arms, a cutter bar connected at its ends between the widely spaced ends of the diverging arms, the closely spaced ends of the diverging arms having tips extending at an angle from said arms, said tips being disposed in parallel relationship and having openings formed therein for receiving pivotal attaching bolts, a sickle blade reciprocably mounted on the cutter bar, a rotatable power shaft carried by one of said diverging arms and extending lengthwise thereof from end to end, power take-off means at one end of the power shaft operatively connected to the sickle bar for actuating the same, driving means drivingly connected to the other end of the shaft adapted to be connected to a source of power, said driving means being supported on said one arm, a cross bar connecting said arms intermediate the cutter bar and the tips, and means connected to said cross bar for raising and lowering the frame.

LEO E. HOYT.

REFERENCES CITED

The following references are of record in the file of this patent:

UNITED STATES PATENTS

| Number | Name | Date |
|---|---|---|
| 1,922,284 | Eckberg | Aug. 15, 1933 |
| 2,120,671 | Jensen et al. | June 14, 1938 |
| 2,263,886 | Munro | Nov. 25, 1941 |
| 2,332,561 | Drott | Oct. 26, 1943 |
| 2,340,488 | Paradise et al. | Feb. 1, 1944 |